US008849837B2

(12) United States Patent
Dua

(10) Patent No.: US 8,849,837 B2
(45) Date of Patent: Sep. 30, 2014

(54) CONFIGURABLE DYNAMIC MATCHING SYSTEM

(71) Applicant: Oracle International Corporation, Redwood Shores, CA (US)

(72) Inventor: Swaranjit Singh Dua, Arcadia, CA (US)

(73) Assignee: Oracle International Corporation, Redwood Shores, CA (US)

( * ) Notice: Subject to any disclaimer, the term of this patent is extended or adjusted under 35 U.S.C. 154(b) by 153 days.

(21) Appl. No.: 13/645,591

(22) Filed: Oct. 5, 2012

(65) Prior Publication Data
US 2014/0101172 A1    Apr. 10, 2014

(51) Int. Cl.
G06F 17/30    (2006.01)
(52) U.S. Cl.
CPC ................ *G06F 17/30557* (2013.01)
USPC .......................................... 707/750
(58) Field of Classification Search
None
See application file for complete search history.

(56) References Cited

U.S. PATENT DOCUMENTS

| 7,035,849 B2* | 4/2006 | Tifft .................................... 1/1 |
| 2007/0150808 A1* | 6/2007 | Harrington .................. 715/523 |
| 2009/0157592 A1 | 6/2009 | Dua |
| 2011/0238637 A1* | 9/2011 | Morozov et al. ............. 707/694 |
| 2012/0102002 A1* | 4/2012 | Sathyanarayana et al. ... 707/687 |

OTHER PUBLICATIONS

Oracle Health Care Master Person Index, Match Engine Release 1.1, http://docs.oracle.com/cd/E20743_01/doc.11/e18470.pdf, Feb. 2011.

* cited by examiner

*Primary Examiner* — Jay Morrison
(74) *Attorney, Agent, or Firm* — Miles & Stockbridge P.C.

(57) ABSTRACT

A system is provided that that dynamically matches data originating from one or more data sources. The system analyzes a matching configuration file, where the matching configuration file includes one or more matching configurations. The system modifies a probabilistic matching algorithm of a matching engine at runtime based on the one or more matching configurations and based on two or more data records of the plurality of data records that require matching. The system compares two data records of a plurality of data records using the modified probabilistic matching algorithm. The system generates a match score for the two data records based on the match weight for each data record field.

20 Claims, 5 Drawing Sheets

CONFIGURABLE DYNAMIC MATCHING SYSTEM

FIELD

One embodiment is directed to a computer system, and more particularly, to a computer system that manages data.

BACKGROUND

Data matching compares data stored in disparate data sources in and across organizations, such as health care organizations. Matching can involve comparing a specific set of static fields in two standardized data records, where a data record represents an entity, such as an individual (e.g., health care patient) or a product (e.g., health care product), and returning a match weight for each static field that indicates a likelihood of a match between the two static fields of the two standardized data records. A match score is generated based on the individual match weights. A higher match score between two data records can indicate a greater likelihood of a match. Data matching can involve comparing different types of data, such as strings, dates, integers, etc. Some examples of data matching can involve comparisons of specialized types of data including first and last names, social security numbers, and dates of various formats. Matching can be used to manage data quality by reducing data duplication and improving data accuracy.

Data matching can be either deterministic or probabilistic. In deterministic matching, either unique identifiers for each data record can be compared to determine a match, or an exact comparison can be used between fields. Deterministic matching is generally not completely reliable since, in some cases, no single field can provide a reliable match between two data records. In probabilistic matching, several field values can be compared between two data records, and a match weight can be generated for each field, where the match weight indicates how closely the two field values match. A match score can be generated as a function of the individual match weights (such as a sum of the individual match weights), where the match score can indicate the likelihood of a match between the two data records.

SUMMARY

One embodiment is directed to a system that dynamically matches data originating from one or more data sources. The system receives data from one or more data sources, where the data includes a plurality of data records. The system further analyzes a matching configuration file, wherein the matching configuration file comprises one or more matching configurations. The system further modifies a probabilistic matching algorithm of a matching engine at runtime based on the one or more one or more matching configurations and based on two or more data records of the plurality of data records that require matching. The system further compares two data records of the plurality of data records using the modified probabilistic matching algorithm, where the comparing includes comparing values of one or more data record fields of the two data records and generating a match weight for each data record field based on the comparison of values, and the one or more matching configurations. The system further generates a match score for the two data records based on the match weight for each data record field.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a system can provide configurable dynamic matching of data records based on data contained within the data records. The system can include a matching engine, where the matching engine includes a probabilistic matching algorithm, and where the matching logic of the probabilistic matching algorithm can be configured (i.e., modified) at runtime based on the data contained with the data records. Thus, the matching logic of the probabilistic matching algorithm can be dynamic. Further, the matching logic of the probabilistic matching algorithm can also be modified at runtime based on a configuration file, where the configuration file can be created or modified at design time. Thus, the matching logic of the probabilistic matching algorithm can also be configurable. Such modifications of the probabilistic matching algorithm can include system-based modifications, condition-based modifications, frequency-based modifications, field-substitution modifications, agreement-weight-maximum-cap modifications, match-caching modifications, or waterfall-matching modifications.

Figure 1:
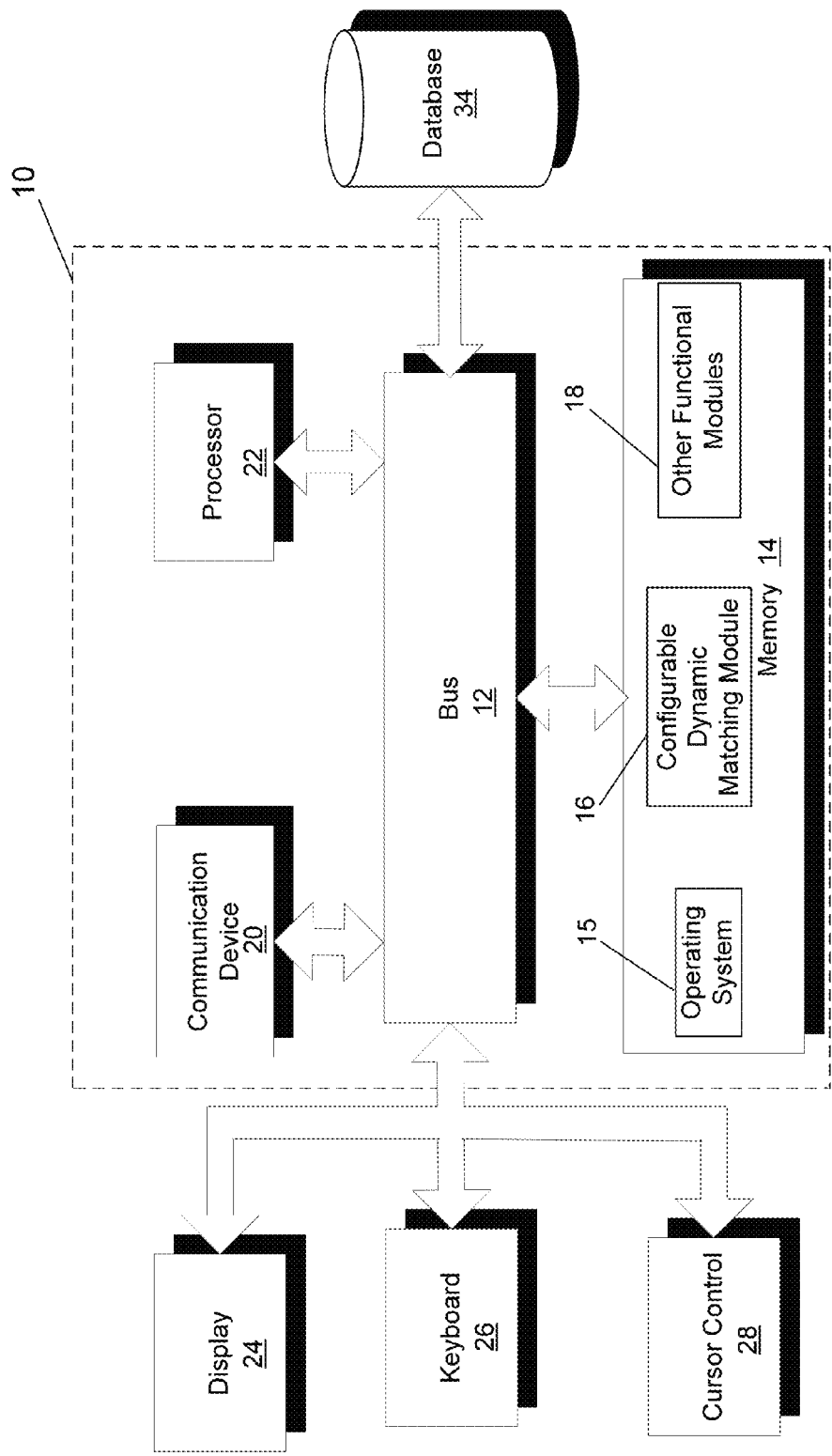
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a configurable dynamic matching module 16, as well as other functional modules 18. Operating system 15 can provide an operating system functionality for system 10. Configurable dynamic matching module 16 can provide functionality for dynamically matching data originating from one or more data sources, as will be described in more detail below. In certain embodiments, configurable dynamic matching module 16 can comprise a plurality of modules, where each module provides specific individual functionality for dynamically matching data originating from one or more data sources. System 10 can also be part of a larger system. Thus, system 10 can include one or more additional functional modules 18 to include the additional functionality. For example, functional modules 18 may include modules that provide additional functionality, such as the "Oracle© Healthcare Master Person Index" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

According to an embodiment, a "matching configuration" is a configuration parameter that modifies a probabilistic matching algorithm. According to an embodiment, a "match set" is an example of a matching configuration, where a match set is a set of data record fields that also includes an agreement weight and a disagreement weight for each data record field of the match set. An agreement weight and a disagreement weight can each be a numerical value (either positive in the case of an agreement weight or negative in the case of a disagreement weight) that can represent a degree of similarity between two values associated with each data record field of the match set. According to the embodiment, a match set can be used to dynamically compare and match two data records, and generate a match score corresponding to the two data records. More specifically, a match set can be used to dynamically compare and match one or more data record fields of the two data records, and generate a match weight corresponding to each data record field of the two data records. The match weight can be based on the agreement weight or the disagreement weight associated with the data record field. In other words, the more closely the values of the one or more data record fields "match," the more the match weight corresponds to the agreement weight. Likewise, the less closely the values of the one or more data record fields "match," the more the match weight corresponds to the disagreement weight. A match score can be generated as a function of the individual match weights (such as a sum of the individual match weights). The match score can represent a degree of similarity of the two data records. As an example, the match score can be a numeric value (either positive or negative) that can represent the degree of similarity of the two data records. In an embodiment, the highest match score generated from one or more match sets can be used to determine whether the two data records "match" (i.e., are similar). For example, a duplicate threshold and a match threshold can be defined, where a match threshold has a higher value than a duplicate threshold. If the highest match score generated is equal to or greater than a duplicate threshold, it can be determined that the two data records potentially "match." If the highest match score generated is equal to or greater than a match threshold, it can be determined that the two data records definitely "match." If the highest match score generated is less than a duplicate threshold, it can be determined that the two data records definitely do not "match."

According to an embodiment, a match set can be associated with a set of one or more systems, where a system represents a data source that data originates from. According to the embodiment, a match set can also be associated with a set of one or more conditions, where a condition can include a comparison of a value of a data record field and a predefined value (e.g., [field=value]). Further, a match set can be associated with a score multiplier, where a score multiplier includes a numeric value, and where the score multiplier can be multiplied with a match score generated by a probabilistic matching algorithm of a match engine that utilizes the match set, in order to normalize the match score. Such normalization can be based on an assumed reliability of the match set utilized by the match engine to generate the match score. For example, if a match score generated for a match set is 50, and a score multiplier associated with the match set has a value of 0.8, then the match score can be normalized to 40. In addition, a match set can include one more child match sets. A child match set is a subset of a match set. In order words, a child match set is a subset of data record fields that also includes an agreement weight and a disagreement weight for each data record field of the child match set, where the subset of data record fields of a child match set includes a fewer number of data record fields than the set of data record fields of a match set. One or more child match sets can be used to produce agreement-weight-maximum-cap modifications, as is described below in greater detail.

According to an embodiment, one or more matching configurations (such as one or more match sets, one or more frequency-based fields, or one or more substitution fields) can be created and stored within a matching configuration file. The matching configuration file can be subsequently analyzed (by a match enhancer, for example), and the one or more match configurations can be applied to a probabilistic matching algorithm of a matching engine, in order to modify the probabilistic matching algorithm. This modification can be accomplished at two levels: a dynamic level and a configurable level. At a dynamic level, as is discussed below in greater detail, the one or more match configurations can cause the probabilistic matching algorithm to behave differently, based on the data that the probabilistic matching algorithm is applied to. Thus, the probabilistic matching algorithm can produce different match scores based on the data the probabilistic matching algorithm is applied to, and thus, the matching engine can be a dynamic matching engine. Further, at a configurable level, as is also discussed below in greater detail, the matching configuration file (and thus, the one or more matching configurations), can be configured at design time, which can cause the probabilistic matching algorithm to be modified, and thus, behave differently at runtime. Thus, the matching engine can also be a configurable matching engine.

One example modification of a probabilistic matching algorithm is a system-based modification. A system-based modification is a modification where a set of data record fields for a match set can be modified based on a system that received data originates from. A probabilistic matching algorithm can be implemented based on the match set, and thus, a modification to the match set can result in a modification of the probabilistic matching algorithm. For example, system A may have reliable social security number ("SSN") data, but system B may not have reliable SSN data. Thus, if data is received from system A, a probabilistic matching algorithm can be implemented based on a match set that includes an SSN data record field. However, if data is received from system B, a probabilistic matching algorithm can be implemented based on a match set that does not include an SSN data record field.

Another example modification of a probabilistic matching algorithm is a condition-based modification. A condition-based modification is a modification where a set of data record fields for a match set can be modified based on a conditional criteria. For example, a set of data record fields for a match set can include a "driver's license identity" data record field and a "medical record identity" data record field. If received data includes a "personal identity" data record field with a value of "driver license," a probabilistic matching algorithm can be implemented based on a match set that includes the "driver's license identity" data record field and that does not include the "medical record identity" data record field. However, if received data includes a "personal identity" data record field with a value of "medical record," a probabilistic matching algorithm can be implemented based on a match set that includes the "medical record identity" data record field and that does not include the "driver's license identity" data record field.

Another example modification of a probabilistic matching algorithm is a frequency-based modification. A frequency-based modification is a modification where a match score generated for at least two data records can be modified based on a frequency of a value of at least one data record field of a match set. For example, a match set can include a "first name" field as a data record field. Two or more data records that include a "first name" field can be compared by a probabilistic matching algorithm, and the probabilistic matching algorithm can generate a match weight for the data record field based on the comparison. However, the frequency of a value contained within the "first name" field of each data record can be evaluated, and the match weight for the data record field can be modified based on the evaluation. For example, the first name "John" can be very common, and an identified match of two or more data records that include a value of "John" in the "first name" field is less likely to be an actual match. In contrast, the first name "Els" may not be very common, and an identified match of two or more data records that include a value of "Els" in the "first name" field is more likely to be an actual match. Thus, a generated match weight for the data record field that includes a value of "John" can be reduced, whereas a generated match weight for the data record field that includes a value of "Els" can remain unchanged (or be reduced by a smaller amount, or even increased).

In certain embodiments, the frequency of a data record field value can only affect a match weight when the match weight is based on an agreement weight of the data record field, and cannot affect the match weight when the match weight is based on a disagreement weight of the data record. For example, a "first name" field of a data record can have an agreement weight of +10 and a disagreement weight of −10. When high frequency first names such as "John" and "John" are matched, the match weight can be reduced by a value, such as 5, because the match weight is based on an agreement weight of +10. But if the names "George" and "John" are compared, and it is determined that the names do not match, the match weight would still be −10 (i.e., the match weight would not be affected), because the match weight is based on the disagreement weight.

In one embodiment, an absolute frequency value associated with each data record field value is stored within a frequency table. An example frequency table is provided below:

| Name | Frequency |
|---|---|
| John | 10000 |
| Evans | 3000 |
| Chu | 200 |

Thus, according to the example embodiment, for every data record field value, an absolute frequency value can be stored within the frequency table. The frequency table could be populated by one of many different techniques known to one of ordinary skill in the art, such as a custom process that includes functionality for populating a table. In one embodiment, during startup, a frequency table can be loaded into memory, and a frequency percentage for each data record field value can be computed. A frequency cache could contain all such data record field values, whose percentage frequency is higher than a cache frequency percentage, which is further described in greater detail below. If a data record field value is not stored in the frequency cache, it can be assumed that the data record field value has a low frequency, and thus, can be given its agreement weight.

In one embodiment, a set of data record fields can be defined for a frequency-based modification. The set of data record fields includes one or more data record fields whose agreement weight can be normalized to a lower weight depending upon a known frequency of data for those one or more data record fields. In addition, a maximum weight per variation can be defined for the frequency-based modification. The maximum weight per variation can be a maximum percentage variation from an agreement weight. In other words, the maximum weight per variation can indicate a maximum variation from the agreement weight that is allowed, regardless of the frequency of the data for the data record field. For example, if a maximum weight per variation is 50%, and an agreement weight for a data record field is 20, then regardless of how much a match weight based on the agreement weight is reduced via a frequency-based modification, the lowest value the match weight could be reduced to would be 10.

Additionally, a cache frequency percentage can be defined for a frequency-based modification. A cache frequency percentage can be a minimum percentage value that a frequency of a value for a data record field must meet before the value is stored in cache. For example, if a cache frequency percentage is 10%, a value must occur with sufficient frequency so that a frequency percentage associated with the value is 10% or greater before the value is stored in cache. Also, one or more alternate match fields can be defined for a frequency-based modification. When a match weight of a data record field is lowered due to a high frequency of the value of the data record field, one or more alternate match fields can be specified, and the match weight for the alternate match field can be set to a weight which is the same as the reduction in the match weight that occurred due to the high frequency of the value of the data record field. Further, a weight reduction computation can be defined for a frequency-based modification. A weight reduction computation can be a computation that overrides default rules on how much a match weight should be reduced when a value of a data record field has a high frequency occurrence. In certain embodiments, the computation can be a plug-in interface, which allows a user to define an algorithm, software module, or software application that can implement the computation.

Another example modification of a probabilistic matching algorithm is a field-substitution modification. A field-substitution modification is a modification where a first value for a first substitution field of a match set is substituted for a second value for a second substitution field of the match set, and vice-versa, before two or more data records are matched. This can be used in a scenario where a data entry error may cause two or more data records to produce a "false negative" because a value has been entered in the wrong data record field in one of the data records. In certain embodiments, an agreement weight and a disagreement weight associated with the data record field as a result of field-substitution modification can each be a lower value than an agreement weight and a disagreement weight associated with the data record field when no field-substitution modification takes place.

Another example modification of a probabilistic matching algorithm is an agreement-weight-maximum-cap modification. An agreement-weight-maximum-cap modification is a modification where one or more data record fields of a match set are grouped together, and an agreement weight is "capped" at a specific value for the group of data record fields of the match set. For example, a match set can have the following data record fields: date of birth, SSN, first name, address, and phone number. The "address" data record field and the "phone number" data record field can have individual agreement weights of 10, but the data record fields can be grouped together, and the agreement weight for the group can be "capped" at 10. The "capping" of the agreement weight for the group also "caps" a match weight for the group.

Another example modification of a probabilistic matching algorithm is a match caching modification. A match caching modification is a modification where a match weight and a pair of data record field values that the match score corresponds to is stored within a cache. Thus, the probabilistic matching algorithm is only required to be implemented when the match weight and the pair of data record field values is not present in the cache.

Another example modification of a probabilistic matching algorithm is a waterfall matching modification. A waterfall matching modification is a modification where two or more match sets are "chained" together so that they are each applied to a plurality of data records, and the match set that produces the highest match score is retained, while the other match scores produced by the other match sets are disregarded.

In an example embodiment involving a waterfall matching modification, there can be two types of match sets: conditional match sets and unconditional match sets. A conditional match set is a match set associated with one or more conditions. An unconditional match set is a match set that is not associated with any conditions. There can be a default match set which is an unconditional match set. In this example embodiment, an overall match score can be a maximum of the scores evaluated from all qualified match sets, where each qualified match set can be used for comparing and matching a pair of data records. According to the example embodiments, conditional match sets can be processed first. The processing of unconditional match sets can be controlled by a matching configuration flag (optionally entitled "ProcessAlwaysUnconditionalMatchSets"). If the matching configuration flag is set to a false value, then after processing the one or more conditional match sets, a match enhancer system can process one or more unconditional match sets only if none of the one or more conditional match sets satisfy the input data. If the matching configuration flag is set to a true value, then the match enhancer system can process both the one or more conditional match sets, and the one or more unconditional match sets, and select the highest score among all the match sets (including both the one or more conditional match sets and the one or more unconditional match sets).

Figure 2:
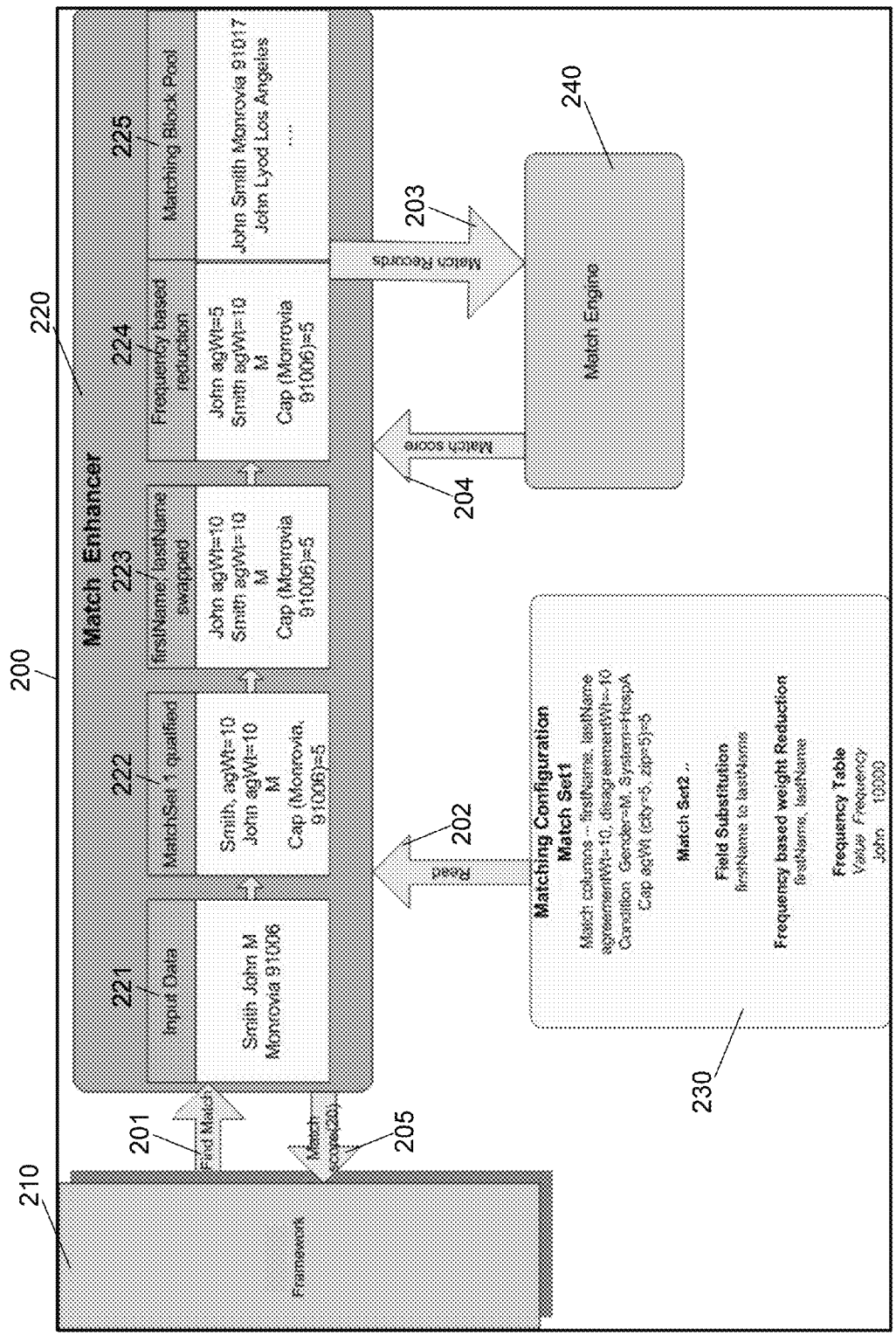
FIG. 2 illustrates a block diagram of a match enhancer system that dynamically configures a matching engine based on received data and a matching configuration file, according to an embodiment of the invention.

FIG. 2 illustrates a block diagram of a match enhancer system 200 that dynamically modifies a matching engine based on received data and a matching configuration file, according to an embodiment of the invention. Match enhancer system 200 includes framework 210, match enhancer 220, matching configuration file 230, and match engine 240. Framework 210 is a framework of a software application that is operably coupled to match enhancer 230, matching configuration file 240, and match engine 250. Framework 210 can include one or more data records, and can invoke match engine 250 to perform dynamic matching on a plurality of data records. Match enhancer 220 is a module (or a plurality of modules) that is configured to receive one or more data records from framework 210, analyze matching configuration file 230, and, based on the matching configurations of matching configuration file 230, modify match engine 240 during runtime of match engine 240. Matching configuration file 230 is a file that includes one or more matching configurations, where the one or more matching configurations are configurable before the execution of match engine 240 (i.e., at design time). In one embodiment, matching configuration file 230 is an extensible markup language ("XML") file, where an example matching configuration file in XML format is further described below in greater detail. Match engine 240 is a module (or a plurality of modules) that includes a probabilistic matching algorithm. Match engine 240 can be configured to receive a plurality of data records, dynamically compare and match the plurality of data records, and generate a match score for each pair of data records within the plurality of data records. The dynamic comparing and matching can be modified based on the one or more matching configurations of matching configuration file 230 that can be implemented by match enhancer 220. In certain embodiments, matching configurations of matching configuration file 230 include one or more match sets, one or more frequency-based fields, or one or more substitution fields.

At 201, framework 210 sends match enhancer 220 a request to find a match for one or more data records. In one embodiment, along with the request, framework 210 sends a plurality of data records to match enhancer 220. In this embodiment, framework 210 requests match enhancer 220 to find a match between two or more data records of the plurality of data records. In another embodiment, framework 210 sends a single data record to match enhancer 220. In this embodiment, framework 210 requests match enhancer 220 to retrieve one or more data records from a data source (such as a database) and to find a match between the single data record and at least one data record of the one or more data records. In the illustrated embodiment of FIG. 2, framework 210 sends a single data record including the data "Smith John M Monrovia 91006," at input data 221. Further, in the illustrated embodiment, match enhancer retrieves two data records: a first data record including the data "John Smith Monrovia 91017" and a second data record including the data "John Lyod Los Angeles," at matching block pool 225.

At 202, match enhancer 220 analyzes matching configuration file 230, where matching configuration file 230 includes one or more matching configurations. In certain embodiments, one or more matching configurations include one or more match sets, one or more frequency-based fields, or one or more substitution fields. In the illustrated embodiment of FIG. 2, matching configuration file 230 includes a match set, identified as "Match Set1". A match set includes one or more data record fields, where each data record field includes an agreement weight and a disagreement weight. In the illustrated embodiment of FIG. 2, Match Set1 includes data record fields "firstName" and "lastName," where each data record field includes a agreement weight of 10, and a disagreement weight of −10 (i.e., "Match columns–firstName, lastName, agreementWt=10, disagreementWt=−10"). Matching configuration file 230 also includes other match sets, such as "Match Set2."

In an embodiment, matching configuration file 230 can include one or more matching configurations that match enhancer 220 can use to modify a probabilistic determination algorithm of match engine 240. As an example of matching configurations, at least one match set of matching configuration file 230 can be associated with one or more systems, where a system represents a data source that data originates from. Thus, according to the embodiment, the at least one match set is only applied to data records received by match enhancer 220 when the data records originate from a system that is associated with the match set. In the illustrated embodiment of FIG. 2, Match Set1 is associated with system "HospA" (i.e., "System=HospA"). Thus, according to the illustrated embodiment, Match Set1 is only applied to data records that are received by match enhancer 220 when the data records originate from system "HospA."

As another example of matching configurations, at least one match set of matching configuration file 230 can be associated with one or more conditions, where a condition can include a comparison of a value of a data record field and a predefined value (e.g., [field=value]). Thus, according to the embodiment, the at least one match set is only applied to data records received by match enhancer 220 when the data records satisfy at least one condition associated with the match set. In the illustrated embodiment of FIG. 2, Match Set1 is associated with a condition "Gender=M" (i.e., "Condition Gender=M"). Thus, according to the illustrated embodiment, Match Set1 is only applied to data records that are received by match enhancer 220 when a value of a "Gender" data record field is "M."

As another example of matching configurations, at least one match set of matching configuration file 230 can be associated with a score multiplier (not illustrated in FIG. 2), where a score multiplier includes a numeric value, and where the score multiplier can be multiplied with a match score generated by a probabilistic matching algorithm of a match engine that utilizes the match set, in order to normalize the match score. As another example of matching configurations, at least one match set of matching configuration file 230 can include a child match set (also not illustrated in FIG. 2), where a child match set is a subset of a match set.

As yet another example of matching configurations, matching configuration file 230 can include one or more frequency-based fields. A frequency-based field identifies a data record field of a match set, where a match weight of the data record field can be modified based on a frequency of a value of the data record field. In one embodiment, matching configuration file 230 can also include a frequency table, where the frequency table includes one or more data record field values, and an absolute frequency value associated with each data record field value. In the illustrated embodiment of FIG. 2, matching configuration file 230 includes frequency-based fields "firstName" and "lastName" (i.e., "Frequency based weight Reduction firstName, last Name"). Furthermore, matching configuration file 230 includes a frequency table that includes a data record field value "John" and an associated absolute frequency value "10000" (i.e., "Frequency Table Value Frequency John 10000").

As an additional example of matching configurations, matching configuration file 230 can include one or more substitution fields. Substitution fields identify data record fields of a match set, where values corresponding to the data record fields can be substituted for each other, before the data record fields of a plurality of data records are compared to determine if the data record fields "match." In the illustrated embodiment of FIG. 2, matching configuration file 230 includes substitution fields "firstName" and "lastName" (i.e., Field Substitution firstName to lastName"). This indicates that values corresponding to the data record field "firstName" can be substituted for values corresponding to the data record field "lastName," and vice-versa.

As yet another example of matching configurations, matching configuration file 230 can include a grouping of one or more data record fields of a match set, and a maximum agreement weight associated with the grouping of the one or more data records. In the illustrated embodiment of FIG. 2, matching configuration file 230 includes a grouping of the "city" and "zip" data record fields, and a maximum agreement weight of 5 associated with the grouping (i.e., "Cap agWt (city=5, zip=5)=5").

As an additional example of matching configurations, matching configuration file 230 can include an indication to store a match weight and a pair of data record field values that the match weight corresponds to within a cache (not illustrated in FIG. 2). As yet another example of matching configurations, matching configuration file 230 can include an indication to perform waterfall matching (also not illustrated in FIG. 2).

At 203, match enhancer 220 modifies a probabilistic matching algorithm of matching engine 240 at runtime based on the one or more matching configurations within matching configuration file 230. In certain embodiments, the one or more matching configurations can include one or more match sets, one or more frequency-based fields, or one or more substitution fields. The modifying of the probabilistic matching algorithm of matching engine 240 can include one or more of the following example modifications. In one example, the probabilistic matching algorithm can be modified by modifying a match weight that is generated for one or more data record fields of the one or more data records based on a frequency of a value of the one or more frequency-based fields included within matching configuration file 230. In the illustrated embodiment of FIG. 2, a match weight that is generated for a "firstName" data record field of the data record "Smith John M Monrovia 91006" and the data record "John Smith Monrovia 91017" (or a match weight that is generated for a "firstName" data record field of the data record "Smith John M Monrovia 91006" and the data record "John Lyod Los Angeles") can be modified based on a frequency of the value "John" for the frequency-based field "firstName," at frequency-based reduction 224.

In another example, the probabilistic matching algorithm can be modified by modifying at least one data record field of at least one match set based on a system that the received data originates from. In the illustrated embodiment of FIG. 2, the data record fields of Match Set1 can be used to compare the data record "Smith John M Monrovia 91006" with one or more data records because the data record originates from system "HospA," at MatchSet 1 qualified 222. In yet another example, the probabilistic matching algorithm can be modified by modifying at least one data record field of at least one match set based on a conditional criteria. In the illustrated embodiment of FIG. 2, the data record fields of Match Set1 can be used to compare the data record "Smith John M Monrovia 91006" with one or more data records because the data record includes a value "M" for the "Gender" data record field, at MatchSet 1 qualified 222.

In another example, the probabilistic matching algorithm can be modified by substituting a first value of a first substitution field of a match set for a second value of a second substitution field of the match set, and substituting the second value of the second substitution field of the match set for the first value of the first substitution field of the match set. In the illustrated embodiment of FIG. 2, the value "Smith" of the data record "Smith John M Monrovia 91006" can be substituted for the value "John" of the data record, and vice-versa, at firstName, lastName swapped 223. In yet another example, the probabilistic matching algorithm can be modified by grouping together one or more data record fields of a match set, and setting an agreement weight for the group of data record fields of the match set to a specific value. In the illustrated embodiment of FIG. 2, the "city" data record field and the "zip" data record field are both grouped together, and an agreement weight for the group of data records fields is set to 5, at MatchSet 1 qualified 222.

In another example, the probabilistic matching algorithm can be modified by storing a match weight and a pair of data record field values that the match weight corresponds to within a cache. In yet another example, the probabilistic matching algorithm can be modified by applying two or more match sets to the one or more data records to produce a plurality of match scores, retaining the highest match score, and disregarding the other match scores.

At 204, match engine 240 compares the one or more data records using the modified probabilistic matching algorithm. Match engine 240 can compare the one or more data records by comparing values of one or more data record fields of the one or more data records, and can generate a match weight for each data record field based on the comparison of values, and one of the agreement weight or the disagreement weight. Match engine 240 can further generate a match score for the at least two data records of the plurality of data records based on the match weight for each data record field. At 205, match enhancer 220 returns the match score generated by match engine 240 to framework 210.

As previously described, in certain embodiments, matching configuration file 230 is an XML file. In these embodiments, a matching configuration file can have three main sections: (a) <matchSet>—can have multiple match sets and properties of each match set; (b) <frequencyBasedFields>—defines data record fields whose weights are modified based on frequency of certain values; and (c) <fieldsSubstitution>—contains multiple sets of fields whose values can be substituted for each other for matching and blocking purposes.

According to an embodiment, an example matching configuration file in XML format is provided:

```
<MatchExtConfiguration>
    <matchWeightMUProbability>false</matchWeightMUProbability>
        <matchSet ID="1">
            <scoreMultiplier>.9</scoreMultiplier>
            <matchColumns>
                <matchColumn>
                    <columnName>
Enterprise.SystemSBR.Person.FirstName_Std</columnName>
                    <matchType>FirstName</matchType>
                    <agreementWeight>10</agreementWeight>
                    <disagreementWeight>-10</disagreementWeight>
                </matchColumn>
                <matchColumn>
                    <columnName>
Enterprise.SystemSBR.Person.LastName_Std</columnName>
                    <matchType>LastName</matchType>
                    <agreementWeight>10</agreementWeight>
                    <disagreementWeight>-10</disagreementWeight>
                </matchColumn>
            </matchColumns>
            <Conditions>
                <fieldCondition>
                    <field> Enterprise.SystemSBR.Person.Gender</field>
                    <value>M</value>
                </fieldCondition>
                <Systems>
                    <System>HospitalA</System>
                    <System>HospitalB</System>
                </Systems>
            </Conditions>
            <childMatchSet capAgreement=10 capDisagreementWt=-10>
                <matchColumns>
                    <matchColumn>
                        <columnName>
Enterprise.SystemSBR.Person.Phone.PhoneNum</columnName>
                        <matchType>Phone</matchType>
                        <agreementWeight>10</agreementWeight>
                        <disagreementWeight>-10</disagreementWeight>
                    </matchColumn>
                    <matchColumn>
```

-continued

```
                    <columnName>
Enterprise.SystemSBR.Person.Address.Staddress</columnName>
                    <matchType>StAddress</matchType>
                </matchColumn>
            </matchColumns>
        </childMatchSet>
    </matchSet>
    <fieldSubstitutions>
        <Matching>
            <substituteField>
                <targetField> Enterprise.SystemSBR.Person.firstName</targetField>
                <sourceField
weightMultiplier=.9>Enterprise.SystemSBR.Person.lastName</sourceField>
                <sourceField>
Enterprise.SystemSBR.Person.Alias[*].firstName</sourceField>
            </substituteField>
        </Matching>
        <Blocking>
            <substituteField>
                <targetField>
Enterprise.SystemSBR.Person.firstName_ph</targetField>
                <sourceField>Enterprise.SystemSBR.Person.lastName</sourceField>
                <PhoneticEncoder-type>Soundex</PhoneticEncoder-type>
            </substituteField>
        </Blocking>
    </fieldSubstitutions>
    <frequencyBasedFields>
<FrequencyWeightReducerPlugin>customPackage.CustomFreuqencyReducer
        </ FrequencyWeightReducerPlugin>
        <field>
            <fieldName> Enterprise.SystemSBR.Person.firstname</fieldName>
        </field>
    </frequencyBasedFields>
    <Waterfall>false</Waterfall>
</MatchExtConfiguration>
```

The example matching configuration file includes a <matchWeightMUProbability> element. According to the embodiment, a set of all agreement weight elements and all disagreement weight elements can contain either an absolute value or an "m-u probability" (where an m-probability is a probability that two or more data record fields match when two or more data records are identified as a matched pair, and where a u-probability is a probability that two or more data record fields match when two or more data records are identified as a unmatched pair). A true value for the <matchWeightMUProbability> element means that an agreement weight element has a m-probability value, and that a disagreement weight element has a u-probability value. A false value for the <matchWeightMUProbability> element means that an agreement weight element has an absolute value and that a disagreement weight element also has an absolute value.

The example matching configuration file includes a <matchSet> element. A matching configuration file can include a plurality of match sets. A <matchSet> element has a unique identity. Each match set can be evaluated independently. A match score evaluated from all the match sets for a given data record can be the one having the highest match score. Further, a match set can contain child match sets. The example matching configuration file also includes a <scoreMultipler> element. A <scoreMultipler> element can include a value that is multipled with the match score computed for the match set to determine a total score. The example matching configuration file also includes an <agreementWeight> element and a <disagreementWeight> element. An <agreementWeight> element and a <disagreementWeight> element are optional elements that can specify values for an agreement weight and a disagreement weight, respectively. If the <agreementWeight> and <disagreementWeight> elements are not specified, default values can be used.

The example matching configuration file also includes a <Conditions> element, where the <Conditions> element includes a <fieldCondition> element and a <Systems> element, where the <Systems> element includes a <system> element. A <Conditions> element can include one or more conditions associated with a match set. A plurality of data records can be compared using a particular match set only if the one or more conditions for the match set are evaluated to true. Conditions can comprise of one or more individual <fieldCondition> elements. Each <fieldCondition> element can have an implicit "AND" operator with other <fieldCondition> elements. A <fieldCondition> element is true only if the data record field at runtime has a value that is specified in a value element of the <fieldCondition> element.

The set of <fieldCondition> elements can also have an implicit "AND" operator with a <Systems> element, where the <Systems> element indicates one or more <System> elements, where a <System> element is true only id the data record originates from the system specified in a value element of the <System> element. Each System> elements can also have an implicit "OR" operator with other <System> elements. Conditional elements can also be empty, which indicates an unconditional match set. Further, the <Systems> element can be empty, which means that the conditions are true for all systems.

The example matching configuration file also includes a <childMatchSet> element. A <childMatchSet> element contains a subset of data record fields, where a total cap for an aggregate of an agreement weight and a disagreement weight can be specified. The example matching configuration file also includes a <fieldSubstitutions> element, where the <fieldSubstitutions> element includes a <Matching> element and a <Blocking> element, where each of the <Matching> and <Blocking> elements includes a <sourceField> element and a <targetField> element. A <fieldSubstitutions> element indicates one or more substitution fields for both matching (i.e., <Matching>) and blocking (i.e., <Blocking>.). A <sourceField> element indicates a source field for a substitution, and a <targetField> element indicates a target field for the substitution. Thus, a value for a field specified in the <sourceField> element can be used in addition to a value for a field specified in the <targetField> element for runtime matching. As an example, if a firstName field is equal to "John," a lastName field is equal to "Smith," and an alias-.firstName field is equal to "Jack" then first name comparisons can include values ["John," "Smith," "Jack"].

The example matching configuration file also includes a <frequencyBasedFields> element, where the <frequencyBasedFields> element includes a <field> element. A <frequencyBasedFields> element indicates one or more frequency-based fields. A frequency-based field is indicated by a <field> element, where a frequency-based field is a data record field whose weight can be reduced based upon a frequency of a value that requires matching. The <field> element optionally includes an <alternateMatch> element that specifies an alternate data record field that can be evaluated if a weight of the frequency-based field is reduced, and the agreement weight of the alternate data record field is the same as the reduced weight of the frequency-based field. The <frequencyBasedFields> element can include a <maxWeightPerVariation> element, which specified a maximum percentage in the weight that can be reduced, regardless of any frequency-based agreement weight reduction rules. The <frequencyBasedFields> element can also include a <FrequencyWeightReducerPlugin> element, which specifies a frequency reducer that can evaluate how much agreement weight of a given data record field should be reduced based upon the frequency percentage of the given data record field value. The frequency reducer can be a custom plug-in that computes a new agreement weight based upon a percentage frequency of a certain string. It can be invoked by a framework for a particular data record field that can be defined in a secondary XML file. For example, the interface for invoking the frequency reducer is shown as follows:

```
Public interface FrequencyWeightReducer {
/**
    Returns new agreement weight for a String that participates in
    matching process.
*/
Double computeAgreementWt(String fieldname, String value, double percentageFrequency, double agreementWt);
}
```

The example configuration file also includes a <waterfall> element. A <waterfall> element indicates if waterfall matching is implemented. A true value for a <waterfall> element indicates that waterfall matching is implemented. A false value for a <waterfall> element indicates that waterfall matching is not implemented.

In one embodiment, there can be a default behavior of frequency-based reduction in agreement weights. In this embodiment, the reduction in agreement weight due to a high frequency of a value is not one linear function across an entire frequency spectrum. Instead, there can be ranges of frequencies, for which there are corresponding ranges of new agreement weights. Below is an example range of frequencies and corresponding range of new agreement weights:

```
if ( percenFrequency > 10%) new agreementWt = 20% of original
agreementWt
else if (percenFrequency is 5% - 10%) new agreementWt = 20% - 30% of
original agreeementWt
else if (percenFrequency is 1% - 5%) new agreementWt = 30% - 50% of
original agreeementWt
else if (percenFrequency is .1% - 1%) new agreementWt = 50% - 70% of
original agreeementWt
else if (percenFrequency is .01% - .1%) new agreementWt = 70% - 90%
of original agreeementWt
```

Below is another example of a matching configuration file in XML format:

```
<match-system-object>
    <object-name>MPI1</object-name>
    <match-columns>
        <match-column>
            <column-name>Enterprise.SystemSBR.MPI1.FirstName__Std</column-name>
            <match-type>FirstName</match-type>
        </match-column>
        <match-column>
            <column-name>Enterprise.SystemSBR.MPI1.LastName__Std</column-name>
            <match-type>LastName</match-type>
        </match-column>
    </match-columns>
<match-system-object>
```

The match columns (i.e., data record fields) defined in the above example matching configuration file can form a default match set. If agreement weights and disagreement weights for any match columns are not defined (such as in the above example matching configuration file), a default set of agreement weights and disagreement weights can be defined in a separate configuration file. Below is an example configuration file that can contain a default set of agreement weights and disagreement weights.

| PrimaryName | 30 | 0 | us | 0.9 | 0.001 | 13 | −2 |
|---|---|---|---|---|---|---|---|
| StreetName | 25 | 0 | us | 0.9 | 0.001 | 11 | 0 |
| HouseNumber | 8 | 0 | un | 0.9 | 0.001 | 11 | 0 |
| StreetDir | 15 | 0 | u | 0.9 | 0.001 | 7 | −2 |
| StreetType | 10 | 0 | u | 0.9 | 0.001 | 7 | −2 |
| FirstName | 15 | 0 | uf | 0.9 | 0.001 | 10 | −4 |
| LastName | 15 | 0 | ul | 0.9 | 0.001 | 10 | −4 |
| String | 25 | 0 | us | 0.9 | 0.001 | 10 | −10 |

Figure 3:
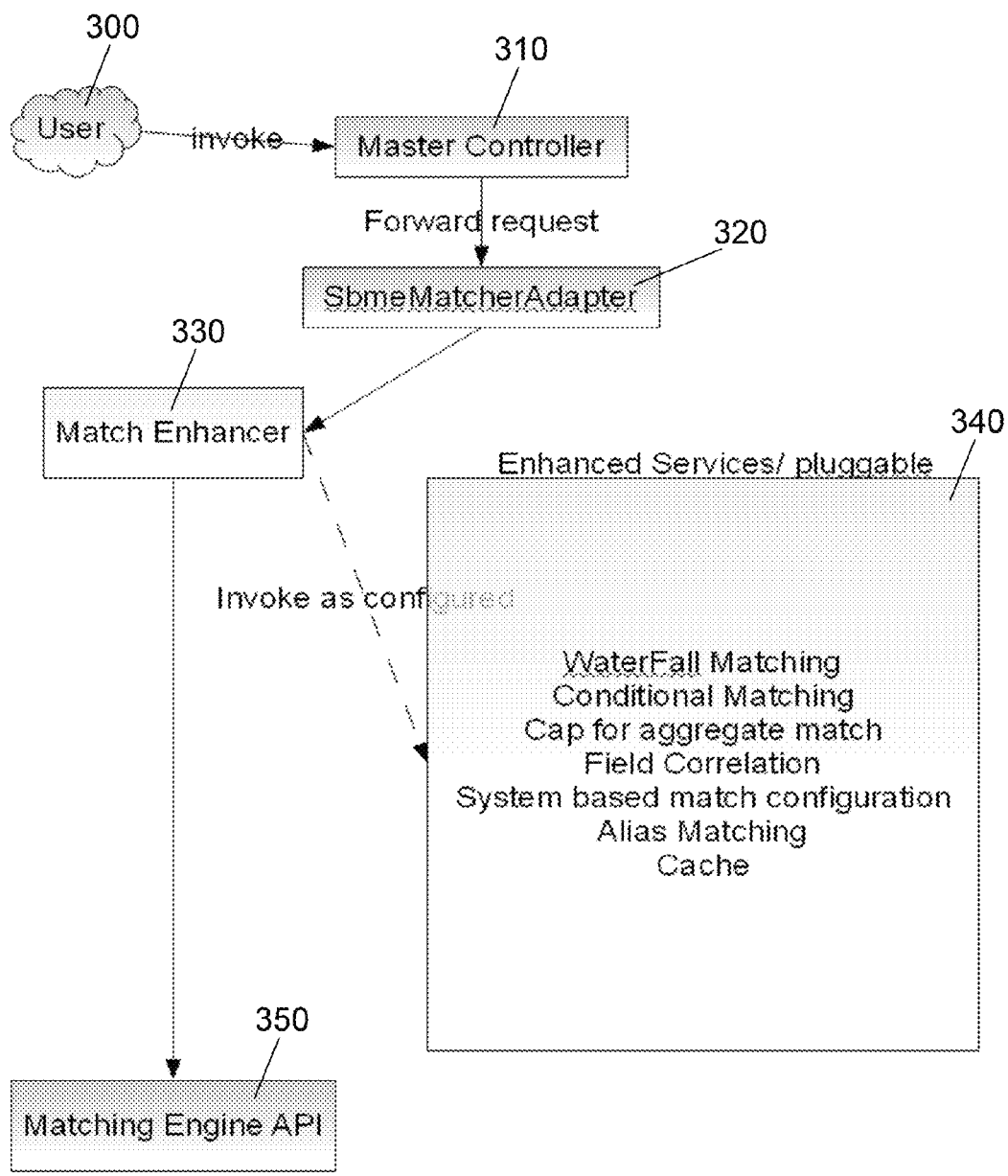
FIG. 3 illustrates a block diagram of an invocation of one or more services by a match enhancer, according to an embodiment of the invention.

FIG. 3 illustrates a block diagram of an invocation of one or more services by a match enhancer (such as match enhancer 220 of FIG. 2), according to an embodiment of the invention. A user 300 invokes a master controller 310 for the purpose of matching two or more data records by sending a request to master controller 310, where master controller 310 is a module (or a plurality of modules) that is configured to control a plurality of objects, including a match enhancer and a match engine application programming interface ("API"). Master controller 310 subsequently forwards the request to SbmeMatcherAdapter 320, which is an object of master controller 310. SbmeMatcherAdapter 320 subsequently invokes match enhancer 330. In one embodiment, match enhancer 330 is similar to match enhancer 220 of FIG. 2. According to the embodiment, match enhancer 330 analyzes a matching configuration file (not illustrated in FIG. 3) and invokes one or more enhanced services 340 to modify a probabilistic matching algorithm of a matching engine that corresponds to matching engine API 350. Enhanced services 340 can include a system-based modification (identified in FIG. 3 as "system-based match configuration"), a condition-based modification (identified in FIG. 3 as "conditional matching"), a frequency-based modification (identified in FIG. 3 as "field correlation")), a field-substitution modification (identified in FIG. 3 as "alias matching"), an agreement-weight-maximum-cap modification (identified in FIG. 3 as "cap for aggregate match"), a match-caching modification (identified in FIG. 3 as "cache"), or a waterfall-matching modification (identified in FIG. 3 as "waterfall matching"). After the probabilistic matching algorithm has been modified, match enhancer 330 invokes matching engine API 350, and matching engine API 350 executes the probabilistic matching algorithm of the matching engine that corresponds to matching engine API 350.

Figure 4:
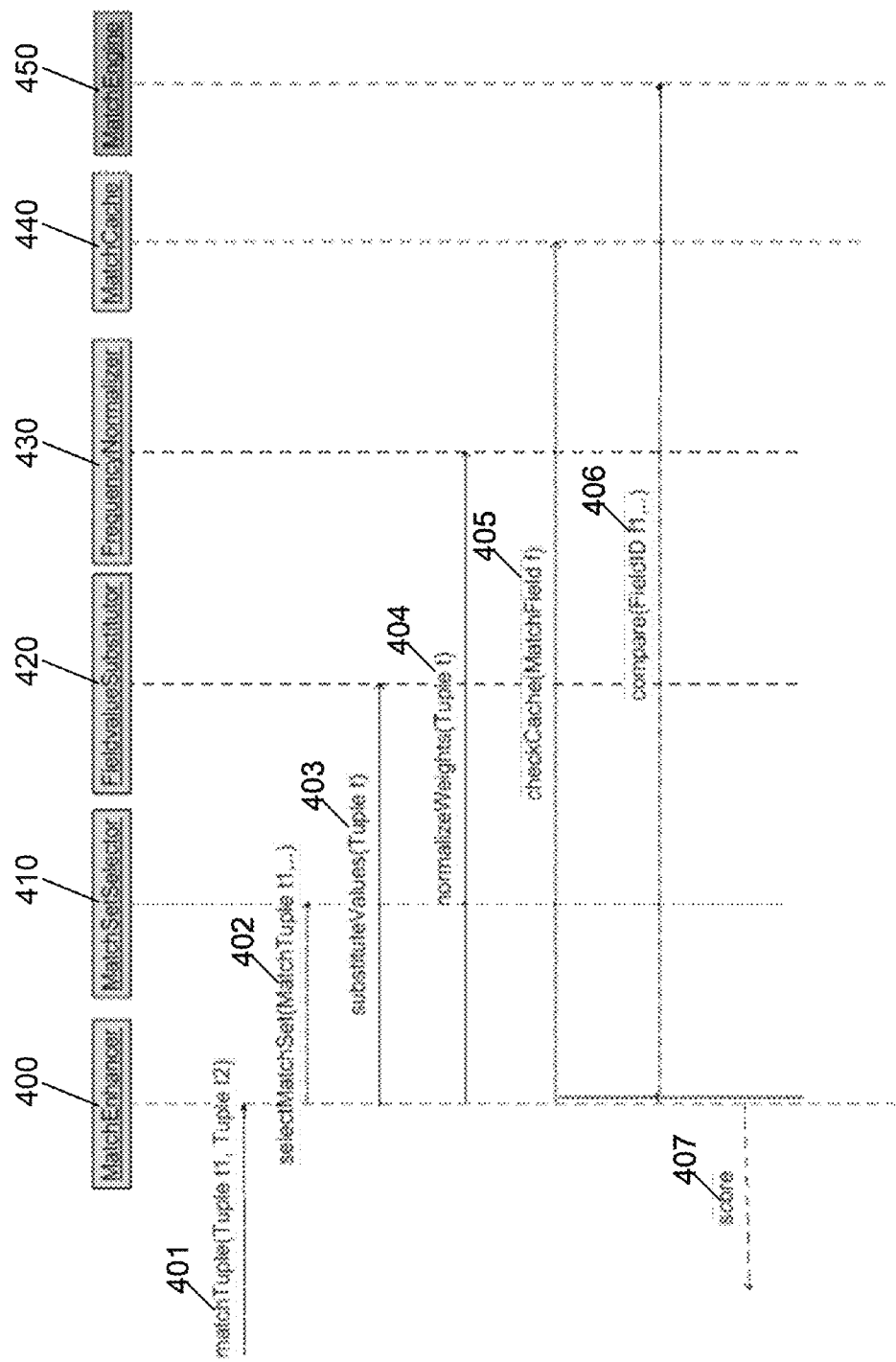
FIG. 4 illustrates a sequence diagram of an invocation of one or more services by a match enhancer, according to another embodiment of the invention.

FIG. 4 illustrates a sequence diagram of an invocation of one or more services by a match enhancer (such as match enhancer 220 of FIG. 2, and match enhancer 330 of FIG. 3), according to another embodiment of the invention. FIG. 4 illustrates how the objects within a match enhancer are internally defined, where the objects are instances of classes that are defined within the match enhancer. FIG. 4 also illustrates a sequence between objects. FIG. 4 includes the following objects: MatchEnhancer 400, MatchSetSelector 401, FieldValueSubstitutor 420, FrequencyNormalizer 430, MatchCache 440, and MatchEngine 450.

At 401, a matchTuple( ) method of MatchEnhancer 400 is invoked. The matchTuple( ) method performs the functionality of modifying a probabilistic matching algorithm of a match engine based on two data records. Tuple t1 (which is a representation of a first data record) and tuple t2 (which is a representation of a second data record) are passed into the matchTuple( ) method of MatchEnhancer 400 as parameters.

At 402, a selectMatchSet( ) method of MatchSetSelector 410 is invoked. The selectMatchSet( ) method performs the functionality of selecting one or more match sets from a matching configuration file (not illustrated in FIG. 4). MatchTuple t1 (which is a representation of the first data record) and MatchTuple t2 (which is a representation of the second data record) are passed into the selectMatchSet( ) method as parameters.

At 403, a substituteValues( ) method of FieldValueSubstitutor 420 is invoked. The substituteValues( ) method performs the functionality of substituting a first value of a first data record field for a second value of a second data record field, and vice-versa, based on a pair of substitution fields stored within the matching configuration file. Tuple t (which is a representation of the first data record) is passed into the substituteValues( ) method as a parameter.

At 404, a normalizeWeights( ) method of FrequencyNormalizer 430 is invoked. The normalizeWeights( ) method performs the functionality of modifying an agreement weight for a data record field due to a frequency of a value associated with the data record field, based on a frequency-based field stored within the matching configuration file. Tuple t (which is a representation of the first data record) is passed into the normalizeWeights( ) method as a parameter.

At 405, a checkCache( ) method of MatchCache 440 is invoked. The checkCache( ) method performs the functionality of checking whether a match weight associated with a pair of data record field values, and the pair of data record field values, are stored in the cache. If they are stored in the cache, the match weight is retrieved from the cache. Otherwise, the match weight is computed at 406, described below. This is performed for each data record field of the first data record. MatchField f (which is a representation of a data record field of the first data record) is passed into the checkCache( ) method as a parameter.

At 406, a compare( ) method of MatchEngine 450 is invoked. The compare( ) method performs the functionality of comparing a value of a data record field of the first data record with a value of the data record field of the second data record. A match weight is generated based on the comparison. This is performed for each data record field of the first data record where the match weight was not retrieved from the cache. A match score is generated, where the match score is based on the individual match weights for the data record fields of the first and second data records. Field ID f1, which represents the data record field of the first data record and the second data record is passed into the compare( ) method as a parameter.

At 407, a maximum match score is returned. For each match set, MatchEngine 450 can return a match score, as previously described. The maximum match score can be the highest match score returned by MatchEngine 450. In certain embodiments, before the maximum match score is returned, the maximum match score is adjusted using a score multiplier (not shown in FIG. 4).

Figure 5:
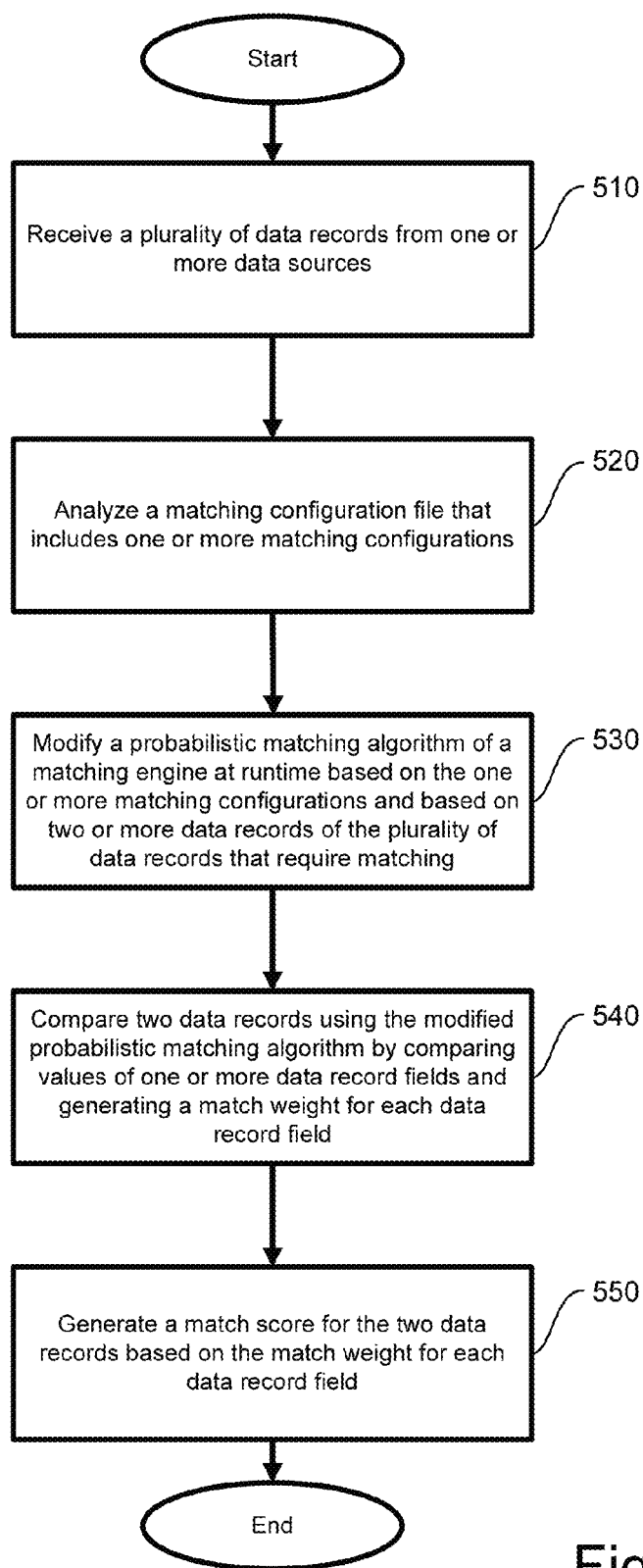
FIG. 5 illustrates a flow diagram of the functionality of a configurable dynamic matching module, according to an embodiment of the invention.

FIG. 5 illustrates a flow diagram of the functionality of a configurable dynamic matching module (such as configurable dynamic matching module 16 of FIG. 1), according to an embodiment of the invention. In one embodiment, the functionality of the flow diagram of FIG. 5, described below, is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In one embodiment, the functionality of the flow diagram of FIG. 5 can be implemented by a configurable dynamic matching module (such as configurable dynamic matching module 16 of FIG. 1).

The flow begins and proceeds to 510. At 510, data is received from one or more data sources. The data includes a plurality of data records. Each data record can include one or more data record fields, where each data record field includes a value. The flow then proceeds to 520.

At 520, a matching configuration file is analyzed. The matching configuration file can include one or more matching configurations. In certain embodiments, the one or more matching configurations include one or more match sets, one or more frequency-based fields, or one or more substitution fields. In these embodiments, each match set can include one or more data record fields, and each data record field can include an agreement weight and a disagreement weight. The flow then proceeds to 530.

At 530, a probabilistic matching algorithm of a matching engine is modified at runtime based on the one or more matching configurations and based on two or more data records of the plurality of data records that require matching. In certain embodiments where the one or more matching configurations include one or more match sets, one or more frequency-based fields, or one or more substitution fields, the modifying can include modifying the match score for the two data records based on a frequency of a value of the one or more frequency-based fields. Alternately, in these embodiments, the modifying can include modifying at least one data record field of at least one match set based on a system that the received data originates from. As an alternative, in these embodiments, the modifying can include modifying at least one data record field of at least one match set based on a conditional criteria. Alternatively, in these embodiments, the modifying can include substituting a first value of a first substitution field of a match set for a second value of a second substitution field of the match set, and substituting the second value of the second substitution field of the match set for the first value of the first substitution field of the match set. Also as an alternative, in these embodiments, the modifying can include grouping together one or more data record fields of a match set, and setting an agreement weight for the group of data record fields of the match to a specific value. Alternatively, in these embodiments, the modifying can include storing each match weight and a pair of data record field values that each match weight corresponds to within a cache. Also as an alternative, in these embodiments, the modifying can include applying two or more match sets to the at least two data records to produce a plurality of match scores, retaining the highest match score, and disregarding the other match scores. In some of these embodiments, the two or more match sets can include one or more conditional match sets and one or more unconditional match sets, where a conditional match set is a match set associated with one or more conditions, and where an unconditional match set is a match set that is not associated with any conditions. In these embodiments, when a matching configuration flag is set to a false value, the applying the two or more match sets can include applying the one or more conditional match sets to the at least two data records, and only applying the one or more unconditional match sets to the at least two data records when none of the one or more conditional match sets satisfy the data. However, when a matching configuration flag is set to a true value, the applying the two or more match sets can include applying both the one or more conditional match sets to the at least two data records and the one or more unconditional match sets to the at least two data records. In certain embodiments, an extent and a type of modification of the probabilistic matching algorithm of the matching engine can be based on the one or more matching configurations, where at least one of the one or more matching configurations can be varied by an administrator. In other embodiments, the one or more matching configurations can be set on an entity represented by at least one data record of the plurality of data records. The flow then proceeds to 540.

At 540, two data records of the plurality of data records are compared using the modified probabilistic matching algorithm. The comparing includes comparing values of one or more data record fields of the two data records and generating a match weight for each data record field based on the comparison of values, and the one or more matching configurations. In certain embodiments where the one or more matching configurations include one or more match sets, one or more frequency-based fields, or one or more substitution fields, the comparing can include comparing values of the one or more data record fields of the two data records and generating a match weight for each data record field based on the comparison of values, and one of the agreement weight or the disagreement weight. The flow then proceeds to 550.

At 550, a match score is generated for the two data records based on the match weight for each data record field. The flow then ends.

Thus, according to an embodiment, a system is provided that can dynamically compare and match data records that are received from one or more sources using a probabilistic matching algorithm. The probabilistic matching algorithm can be modified based on a matching configuration file that can be configured by a user, to transform the probabilistic matching algorithm into a configurable dynamic probabilistic matching algorithm capable of performing dynamic matching. Such dynamic matching can produce more accurate matches. The modifications to the probabilistic matching algorithm that involve caching can help improve overall performance of the system.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon that, when executed by a processor, cause the processor to dynamically match data originating from one or more data sources, the matching comprising:
receiving data from one or more data sources, wherein the data comprises a plurality of data records;
analyzing a matching configuration file, wherein the matching configuration file comprises one or more matching configurations, wherein the one or more matching configurations comprise one or more match sets, and wherein each match set comprises one or more data record fields and one or more frequency-based fields;
modifying a probabilistic matching algorithm of a matching engine at runtime based on the one or more matching configurations and based on two or more data records of the plurality of data records that require matching;

comparing two data records of the plurality of data records using the modified probabilistic matching algorithm, wherein the comparing comprises comparing values of one or more data record fields of the two data records and generating a match weight for each data record field based on the comparison of values, and the one or more matching configurations;

generating a match score for the two data records based on the match weight for each data record field; and modifying the match score for the two data records based on a frequency of a value of the one or more frequency-based fields.

2. The non-transitory computer-readable medium of claim 1, wherein the one or more matching configurations further comprise one or more substitution fields, and wherein each data record field comprises an agreement weight and a disagreement weight.

3. The non-transitory computer-readable medium of claim 2, wherein the modifying the probabilistic matching algorithm of the matching engine comprises modifying at least one data record field of at least one match set based on a system that the received data originates from.

4. The non-transitory computer-readable medium of claim 2, wherein the modifying the probabilistic matching algorithm of the matching engine comprises modifying at least one data record field of at least one match set based on a conditional criteria.

5. The non-transitory computer-readable medium of claim 2, wherein the modifying the probabilistic matching algorithm of the matching engine comprises:
   substituting a first value of a first substitution field of a match set for a second value of a second substitution field of the match set; and
   substituting the second value of the second substitution field of the match set for the first value of the first substitution field of the match set.

6. The non-transitory computer-readable medium of claim 2, wherein the modifying the probabilistic matching algorithm of the matching engine comprises:
   grouping together one or more data record fields of a match set; and
   setting an agreement weight for the group of data record fields of the match to a specific value.

7. The non-transitory computer-readable medium of claim 2, wherein the modifying the probabilistic matching algorithm of the matching engine comprises storing each match weight and a pair of data record field values that each match weight corresponds to within a cache.

8. The non-transitory computer-readable medium of claim 2, wherein the modifying the probabilistic matching algorithm of the matching engine comprises:
   applying two or more match sets to the at least two data records to produce a plurality of match scores;
   retaining the highest match score; and
   disregarding the other match scores.

9. The non-transitory computer-readable medium of claim 8,
   wherein the two or more match sets comprises one or more conditional match sets and one or more unconditional match sets, wherein a conditional match set comprises a match set associated with one or more conditions, and wherein an unconditional match set comprises a match set that is not associated with any conditions;
   wherein the applying two or more match sets comprises, when a matching configuration flag is set to a false value, applying the one or more conditional match sets to the at least two data records, and only applying the one or more unconditional match sets to the at least two data records when none of the one or more conditional match sets satisfy the data; and
   wherein the applying two or more match sets comprises, when the matching configuration flag is set to a true value, applying both the one or more conditional match sets to the at least two data records and the one or more unconditional match sets to the at least two data records.

10. The non-transitory computer-readable medium of claim 1, wherein an extent and a type of modification of the probabilistic matching algorithm of the matching engine is based on the one or more matching configurations, wherein at least one of the one or more matching configurations is varied by an administrator.

11. The non-transitory computer-readable medium of claim 1, wherein the one or more matching configurations are set on an entity represented by at least one data record of the plurality of data records.

12. A computer-implemented method for dynamically matching data originating from one or more data sources, the computer-implemented method comprising:
   receiving data from one or more data sources, wherein the data comprises a plurality of data records;
   analyzing a matching configuration file, wherein the matching configuration file comprises one or more matching configurations, wherein the one or more matching configurations comprise one or more match sets, and wherein each match set comprises one or more data record fields and one or more frequency-based fields;
   modifying a probabilistic matching algorithm of a matching engine at runtime based on the one or more matching configurations and based on two or more data records of the plurality of data records that require matching;
   comparing two data records of the plurality of data records using the modified probabilistic matching algorithm, wherein the comparing comprises comparing values of one or more data record fields of the two data records and generating a match weight for each data record field based on the comparison of values, and the one or more matching configurations; and
   generating a match score for the two data records based on the match weight for each data record field; and
   modifying the match score for the two data records based on a frequency of a value of the one or more frequency-based fields.

13. The computer-implemented method of claim 12, wherein the one or more matching configurations further comprise one or more substitution fields, and wherein each data record field comprises an agreement weight and a disagreement weight.

14. The computer-implemented method of claim 13, wherein the modifying the probabilistic matching algorithm of the matching engine comprises modifying at least one data record field of at least one match set based on a system that the received data originates from.

15. The computer-implemented method of claim 13, wherein the modifying the probabilistic matching algorithm of the matching engine comprises modifying at least one data record field of at least one match set based on a conditional criteria.

16. The computer-implemented method of claim 13, wherein the modifying the probabilistic matching algorithm of the matching engine comprises:
   substituting a first value of a first substitution field of a match set for a second value of a second substitution field of the match set; and substituting the second value of the second substitution field of the match set for the first value of the first substitution field of the match set.

17. A system for dynamically matching data originating from one or more data sources, the system comprising:
- a hardware processor;
- a receiving module configured to receive data from one or more data sources, wherein the data comprises a plurality of data records;
- an analyzing module configured to analyze a matching configuration file, wherein the matching configuration file comprises one or more matching configurations, wherein the one or more matching configurations comprise one or more match sets, and wherein each match set comprises one or more data record fields and one or more frequency-based fields;
- a modifying module configured to modify a probabilistic matching algorithm of a matching engine at runtime based on the one or more matching configurations and based on two or more data records of the plurality of data records that require matching;
- a comparing module configured to compare two data records of the plurality of data records using the modified probabilistic matching algorithm, wherein the comparing comprises comparing values of one or more data record fields of the two data records and generating a match weight for each data record field based on the comparison of values, and the one or more matching configurations; and
- a generating module configured to generate a match score for the two data records based on the match weight for each data record field;
- wherein the modifying module is configured to modify the match score for the two data records based on a frequency of a value of the one or more frequency-based fields.

18. The system of claim 17, wherein the one or more matching configurations further comprise one or more substitution fields, and wherein each data record field comprises an agreement weight and a disagreement weight.

19. The system of claim 18, wherein the modifying module is configured to modify at least one data record field of at least one match set based on a system that the received data originates from.

20. The system of claim 18, wherein the modifying module is configured to modify at least one data record field of at least one match set based on a conditional criteria.

* * * * *

UNITED STATES PATENT AND TRADEMARK OFFICE
CERTIFICATE OF CORRECTION

PATENT NO. : 8,849,837 B2  
APPLICATION NO. : 13/645591  
DATED : September 30, 2014  
INVENTOR(S) : Dua Page 1 of 1

It is certified that error appears in the above-identified patent and that said Letters Patent is hereby corrected as shown below:

On title page, column 2, under Abstract, line 1, after "provided" delete "that".

Signed and Sealed this  
Twenty-eighth Day of April, 2015

Michelle K. Lee  
*Director of the United States Patent and Trademark Office*